3,592,674
Patented July 13, 1971

3,592,674
METHOD OF PREPARING A CALCIUM CARBONATE-MAGNESIUM HYDROXIDE PIGMENT AND THE PIGMENT PRODUCED
John Maskal and Ivan M. Thompson, Ludington, Mich., assignors to The Dow Chemical Company, Midland, Mich.
No Drawing. Filed Nov. 4, 1968, Ser. No. 773,340
Int. Cl. C09c 1/02
U.S. Cl. 106—306
5 Claims

ABSTRACT OF THE DISCLOSURE

This specification discloses a method of preparing a pigment for use, for example, on paper surfaces comprising: calcining a dolomitic limestone to the oxides of magnesium and calcium, slaking at least the calcium oxide component in water to the corresponding hydroxide, carbonating only the calcium portion thereof to the carbonate, slaking any remaining magnesium oxide in water to the corresponding hydroxide, dewatering the resulting slurry, and if desired, washing and homogenizing the calcium carbonate and magnesium hydroxide mixture, to produce a micron sized pigment product useful in a number of applications.

---

A primary object of the present invention is to provide a novel method of preparing a $CaCO_3$-$Mg(OH)_2$ pigment by the conversion of low cost, readily procurable, mineral dolomite into a quality pigment which has the attributes of high whiteness, good opacifying power, and in the slurry form, low viscosity. A related object is to provide a slurry of such pigment which may be easily handled and economically shipped.

THE INVENTION

The above and other objects and advantages will become apparent from a reading of the following detailed description.

A dolomitic limestone material, which is preferably essentially free of discoloring impurities such as $SiO_2$ and $R_2O_3$ type impurities, e.g. $Fe_2O_3$, $Al_2O_3$, is calcined at a temperature, e.g., of from about 1200° C. to about 1400° C. to form CaO and MgO. The dolomine so-calcined (commonly called dolime) is then slaked or hydrated in water, preferably at an elevated starting temperature, e.g., about 60° to 80° C. Slaking is conducted at this point for a period of time sufficient to convert at least the CaO of the dolime to the corresponding hydroxide. For instance, the dolime may be slaked starting at 60° C. for about 20 minutes. Optionally slaking of the dolime may be continued for a longer period, e.g. 24 hours or so in order to convert MgO to the hydroxide but this is unnecessary to the practice of the invention. The slaked dolime is reacted with carbon dioxide, using for example a suitable carbon dioxide-containing gas, to carbonate the calcium hydroxide portion thereof, leaving the magnesium oxide or magnesium hydroxide uncarbonated. The gaseous effluent of the kiln used to calcine the dolomite may be advantageously employed in this carbonation step. These gases contain approximately 20 to 25 percent by volume of $CO_2$. The calcium hydroxide carbonates preferentially to the magnesium hydroxide. Care must be taken in the carbonation step so as to terminate carbonation prior to the carbonation of the magnesium oxide or magnesium hydroxide portion of the slaked dolime slurry. Carbonation can be monitored by sample titrations to prevent such magnesium carbonate formation. Conversion to magnesium carbonate is undesirable because of (1) the large particle size of the resulting $MgCO_3 \cdot 3H_2O$, (2) its higher solubility as compared to that of $Mg(OH)_2$, and (3) because of increased viscosity of the slurry. Finally, slaking is completed, if need be, to convert any remaining magnesium oxide to the hydroxide.

Thereafter, the slurry, as carbonated, may optionally be subjected to a series of repetitive filtering and "creaming" steps to increase the solids content to about 60% by weight. An even higher solids content slurry is possible by adding a small quantity, e.g., from 0.5 to 1.5%, of a dispersant, such as, e.g., sodium hexametaphosphate, sodium tetraphosphate, casein, gum arabic, sodium silicate, etc., during the later creaming operations. A suitable type of repetitive filtering and creaming as described herein is disclosed in U.S. Letters Patent 3,197,322 and may be used to advantage in the present invention. The slurry may thereafter be dried or may be shipped and used directly in a pigment application.

In carbonating the slaked dolime slurry in accordance with the present invention, means should be employed which will rapidly and efficiently convert the calcium hydroxide portion of the dolime slurry to calcium carbonate. Such means include a so-called Turbo Carbonator, a commercial device. Briefly, this device consists of a motor driving an impeller which is normally immersed in the slurry and surrounded by a ring in the nature of a circular section having a multiplicity of slits therearound. A carbon dioxide containing gas is passed into the impeller zone which, when rotated rapidly, circulates the slurry and concurrently disperses the gas therein, whereupon, carbonation occurs.

Progress of the carbonation of the calcium hydroxide may be followed or monitored by rapidly titrating small samples of the carbonated slurry diluted in water to, e.g., a phenolphthalein end-point with $N/1$ hydrochloric acid to insure that carbonation of any significant amount of the magnesium hydroxide does not occur.

Dolomitic limestone, which may be used in the process of the present invention, include, for example, Cedarville, Michigan Dolomite, Ohio Dolomitic stone and other high purity dolomite minerals, preferably those comprising approximately equimolar mixtures of magnesium and calcium carbonates having a low impurity content, since these impurities detract from the ultimate whiteness of the pigment product made hereby.

By means of the present invention a pigment composition comprising a dry or slurried mixture essentially of calcium carbonate and magnesium hydroxide is obtained. This product is characterized by a high whiteness and/or brightness, a high opacifying power, and a low viscosity property in the slurry. Moreover, because of the high solids content which can be obtained in a slurry of the product, the product may be readily handled as by pumping and may be relatively economical to ship and market in the slurry form.

The composition made by the method of the present invention may be used as a coating pigment. The pigment may be applied on a paper web by means of a blade or roll coater applicator from an aqueous dispersion containing binders such as starch, protein or latex, and which may include other common pigments such as clay (kaolin). When used as such, the high whiteness and the good opacifying power of the product is superior to many of the conventional clay and $CaCO_3$ based pigments used.

The pigment has also utility as a paper filler in which case, it is dispersed with the pulp fibers and thus becomes internally combined with the paper web as it is formed on the paper machine from the pulp furnish. Due to the pigment's solubility in acids it is recommended for systems operating at at least a pH of 6 and preferably in neutral or alkaline systems.

Whiteness and opacifying power of the present novel pigment composition relative to conventional pigments may be determined by use of conventional apparatus. For example, a Bausch and Lomb Spectrophotometer may be employed for comparing the reflectance of the dry test specimen relative to a standard dry MgO specimen which is considered to have a 100 percent reflectance. The opacifying power of the pigment composition may be estimated by the Milton-Jacobsen method, whereby a coating is cast on a black glass panel with a Bird doctor blade at a thickness of about one mil. A 5 sq. in. area of this slightly translucent film is measured for reflectance, $R_B$, and likewise the reflectance $R\infty$ of a thick layer over white glass. These readings are then converted by means of published graphs into values of scattering power, the measured area of the coating is then removed from the black glass and weighed, thus enabling expression of the scattering coefficient, SC, in terms of an accurately known coating weight unit (lbs. per TAPPI ream).

The following examples serve to further illustrate the present invention and provide various operable and preferred embodiments thereof, but are not to be construed as limiting the invention thereto.

EXAMPLE 1

Dolomite stone was calcined by conventional commercial kiln methods in the plant to yield dolime, i.e., an essentially equimolar ratio of CaO and MgO. Two thousand grams of this dolime was slaked in 6000 ml. of 80° C. water while stirring. An additional, 1000 ml. of cold water was added in portions to the reaction vessel during slaking to control the violence of the reaction. The slurry solids were hydrated at 60° C. for 24 hours while stirring; and then screened through a 200 mesh sieve (U.S. Standard Sieve Series) to remove grits, whereupon, the slurry volume was adjusted to 9 liters (volume of the carbonator device used hereinafter) with water, and the temperature adjusted to 30° C. Using a laboratory designed turbo mixer, the $Ca(OH)_2$ portion of the solids was carbonated with a 20 volume precent $CO_2$–80 volume percent air mixture at a rate of about 1 c.f.m. per cubic foot of slurry. The temperature of the slurry was not controlled and rose to about 56° C. during the course of the carbonation. Progress of the carbonation of the $Ca(OH)_2$ was followed by rapidly titrating 10 ml. of slurry in 150 ml. of water to a phenolphthalein end-point with N/1 HCl. A titration volume of about 1 ml. indicated that the carbonation of the $Ca(OH)_2$ was near completion.

So-carbonated, the slurry was subjected to a series of repetitive filtering and creaming steps to increase the solids content to about 60%. Homogenization, such as, by a five minute treatment in a Waring Blender, reduced $CaCO_3$ and $Mg(OH)_2$ agglomerate sizes from 1.5–2 microns down to about 0.5–1 micron.

The product obtained had a whiteness of 96.9% indicating its high utility as a pigment in the paper industry.

The opacifying power of the product was good as evidenced by a scattering coefficient of 0.196 when formulated as an equal weight mixture with clay and containing 15 parts by weight of binder based on the total weight of clay and pigment. This was 18% higher than for a competitive $CaCO_3$ that was evaluated in a parallel test, and 44% higher than for an all clay formulation.

EXAMPLE 2

As hereinbefore disclosed the method of the present invention may be varied by hydrating the MgO portion of the dolime solids after the carbonation step. The initial contact of the dolime solids with 80° C. water results in the rapid conversion of the CaO to $Ca(OH)_2$. However, to convert the bulk of the dolime MgO solids in aqueous slurry to $Mg(OH)_2$ may require up to about 24 hours of additional reaction time at 60° C.

An example of the post hydration method is as follows: two thousand grams of dolime were slaked in 6000 ml. of 80° C. water while stirring. An additional 1000 ml. of cold water was added in portions to the reaction vessel during slaking to control the violence of the reaction. The slurry was screened through a No. 200 mesh sieve (U.S. Standard Sieve Series), adjusted to a nine liter volume with water, and cooled to a temperature of 30° C.—all within a two hour period from the slaking step. Using a turbo mixer, the $Ca(OH)_2$ portion of the solids was carbonated with a 20 volume percent $CO_2$–80 volume percent air mixture at a rate of about 1 c.f.m. per cubic foot of slurry. The temperature of the slurry was not controlled and rose to about 57° C. during the course of the carbonation. Progress of the carbonation of the $Ca(OH)_2$ was followed by rapidly titrating 10 ml. of slurry in 150 ml. of water to a phenolphthalein end-point with N/1 HCl. A titration volume of about 1 ml. indicated that the carbonation of the $Ca(OH)_2$ was near completion. The slurry solids were hydrated at 60° C. for 24 hours while stirring to convert the dolime MgO solids to $Mg(OH)_2$.

The resultant dewatered, homogenized solid product was essentially identical with that obtained in Example 1. The whiteness of the solids was 98.1% again showing the utility of the novel slurry obtained by the method of the present invention for pigments in the paper industry.

The present invention may be modified or changed without departing from the spirit or scope thereof.

What is claimed is:
1. A method which comprises:
   (a) calcining a dolomitic limestone material;
   (b) slaking, in one or more steps, the calcined material for a time sufficient to react both the calcium and magnesium components of the material to form the corresponding hydroxides of each; and
   (c) after slaking the calcined material for a time sufficient to hydrate substantially all of the calcium oxide, carbonating the slaked material for a time sufficient to react essentially all of the calcium hydroxide only, thereby fomring a magnesium hydroxide-calcium carbonate slurry.

2. The method of claim 1 and including the additional step of increasing the solids content of said slurry to at least about 60 weight percent.

3. The method of claim 1 and including the step of drying the magnesium hydroxide-calcium carbonate slurry.

4. The method of claim 1 wherein in step (b) at least the calcium component is slaked to form calcium hydroxide and including the additional step of slaking the partially carbonated material to react essentially all of the remaining magnesium oxide to form magnesium hydroxide.

5. The calcium carbonate-magnesium hydroxide product obtained from the process of claim 1 further characterized by high whiteness, god opacifying power and low viscosity.

References Cited

UNITED STATES PATENTS 3,197,322   7/1965   Maskal et al.

TOBIAS E. LEVOW, Primary Examiner

H. M. S. SNEED, Assistant Examiner

U.S. Cl. X.R.

162—181